United States Patent [19]
Aleksic et al.

[11] Patent Number: 6,020,921
[45] Date of Patent: Feb. 1, 2000

[54] SIMPLE GAMMA CORRECTION CIRCUIT FOR MULTIMEDIA

[75] Inventors: Milivoje Aleksic, Richmond Hill; Oswin Hall; Raymond Li, both of Markham, all of Canada

[73] Assignee: ATI Technologies Inc., Unionville, Canada

[21] Appl. No.: 08/851,035

[22] Filed: May 5, 1997

[51] Int. Cl.[7] .................................................. H04N 5/202
[52] U.S. Cl. ........................... 348/254; 348/674; 358/518
[58] Field of Search ..................... 348/254, 255, 348/256, 674, 675; 358/518, 519; H04N 5/202

[56] References Cited

U.S. PATENT DOCUMENTS

| | | | |
|---|---|---|---|
| 5,473,372 | 12/1995 | Nobuoka et al. | 348/254 |
| 5,473,373 | 12/1995 | Hwung et al. | 348/254 |
| 5,818,521 | 10/1998 | Hieda | 348/222 |

OTHER PUBLICATIONS

"Fundamentals of Interactive Computer Graphics", by JD Foley and A. Van Dam, Addison–Wesley Publishing Company, copyright 1982 pp. 564–567.

Primary Examiner—Tuan Ho
Attorney, Agent, or Firm—Pascal & Associates

[57] ABSTRACT

A gamma correction circuit comprising circuit apparatus for approximating in linear translation circuits successive nonlinear portions of a gamma correction curve, apparatus for applying an input luminance (Y) signal to the circuit apparatus, and selection apparatus for selecting signals translated by any of the circuit apparatus as a gamma corrected output signal depending on whether the input signal falls within predetermined ranges approximately corresponding to the nonlinear portions of the gamma correction curve.

17 Claims, 3 Drawing Sheets

SIMPLE GAMMA CORRECTION CIRCUIT FOR MULTIMEDIA

FIELD OF THE INVENTION

This invention relates to the field of display circuits and in particular to a gamma correction circuit such as those used to drive computer displays.

BACKGROUND TO THE INVENTION

Computer displays are typically driven by an analog RGB signal which is derived from a YUV to RGB conversion circuit, wherein the Y signal is well known to represent luminance (the intensity of light) of a pixel to be reproduced on the display. Unfortunately, a cathode ray tube display has an inherently nonlinear transfer function, wherein the intensity of light reproduced is proportional to the voltage input raised to the power gamma (2.5). Gamma correction is the process of compensating for this nonlinearity to achieve correct intensity reproduction.

The incoming YUV data signal can be received with or without gamma correction. The standard CCIR Rec 709 specifies the transfer function for gamma correction with exponent 0.45, wherein $R' = 4.5R$ where $R <= 0.018$ $R' = 1.099R^{0.45} - 0.099$ where $R > 0.018$ and wherein R is a normalized intensity value in the range 0 to 1 and R' is a gamma corrected value in the range 0 to 1.

In devices used for consumer video, such as a TV display, gamma correction is done prior to transmission of the video signal, which saves the cost of adding a gamma correction circuit to every TV receiver. The standard method of obtaining the gamma correction value is by accessing a lookup table.

In a typical computer system, the color component is represented by an 8 bit digital value. For gamma correction of a YUV signal, a lookup table read only memory (ROM) of 256*8=2048 bits is required. If gamma correction is performed on an RGB signal, the system must use a ROM three times the above size, 3*2048=6144 bits. A description of gamma correction may be found in the text "Fundamentals of Interactive Computer Graphics" by JD Foley and A. Van DAM, Addison-Wesley Publishing Company, copyright 1982, pp. 564–567.

SUMMARY OF THE INVENTION

The present invention provides a means to avoid using a lookup table, thus both reducing the cost of the computer, and avoiding the time of accessing the lookup table. Instead the present invention provides a useful approximation to the luminance (Y) gamma correction curve using inexpensive hardware components.

In accordance with an embodiment of the present invention, a gamma correction circuit comprises circuit apparatus for approximating in linear translation circuits successive nonlinear portions of a gamma correction curve, apparatus for applying an input luminance (Y) signal to the circuit apparatus, and selection apparatus for selecting signals translated by any of the circuit apparatus as a gamma corrected output signal depending on whether the input signal falls within predetermined ranges approximately corresponding to the nonlinear portions of the gamma correction curve.

In accordance with another embodiment, a gamma correction circuit comprises a first pair of multiplexers, apparatus for applying luminance signals 4*Y, Y, Y and Y/2 to respective inputs of a first of the first pair of multiplexers, where Y is an input luminance signal, apparatus for applying signals having constant values −48, x, 0 and 118 to corresponding respective inputs of a second of the second pair of multiplexers, each multiplexer of the first pair of multiplexers having input select control inputs, a second pair of multiplexers, apparatus for applying a null, CMP1 and CMP2, CMP3 and CMP5, and CMP4 and CMP6 signals to respective inputs of a first of the second pair of multiplexers, apparatus for applying a null and constant signal values 54, 46 and 22 to respective inputs of a second of the second pair of multiplexers, apparatus for providing a gamma select signal to corresponding control inputs of the second pair of multiplexers, apparatus for applying an output signal of the first of the second pair of multiplexers to corresponding control inputs of the first pair of multiplexer, apparatus for providing an output signal of the second multiplexer of the second pair of multiplexers as the signal x, a plurality of comparison circuits for providing the respective output signals CMP1, CMP2, CMP3, CMP4, CMP5 and CMP6, apparatus for applying the Y signal to an input of each of the comparison circuits, and apparatus for applying signals having constant values 34, 127, 143, 191, 31 and 23 to respective other inputs of respective ones of the comparison circuits, and wherein the gamma select signal controls the gamma correction circuit to provide gamma correction in accordance with a truth table:

| gamma select | gamma correct |
| --- | --- |
| 0,0 | no correction |
| 0,1 | 0.45 |
| 1,0 | 1/1.8 |
| 1,1 | 1/1.4 |

BRIEF INTRODUCTION TO THE DRAWINGS

A better understanding of the invention will be obtained by considering the detailed description below, with reference to the following drawings, in which:

FIG. 1 is a graph of an ideal video signal vs intensity curve and a corresponding representative curve which results from the present invention, FIG. 2 is a block diagram of part of a display driving system, FIG. 3 is a block diagram of an embodiment of the present invention, and FIG. 4 is a block diagram of another embodiment of the present invention.

DETAILED DESCRIPTION OF EMBODIMENTS OF THE INVENTION

Figure 1:
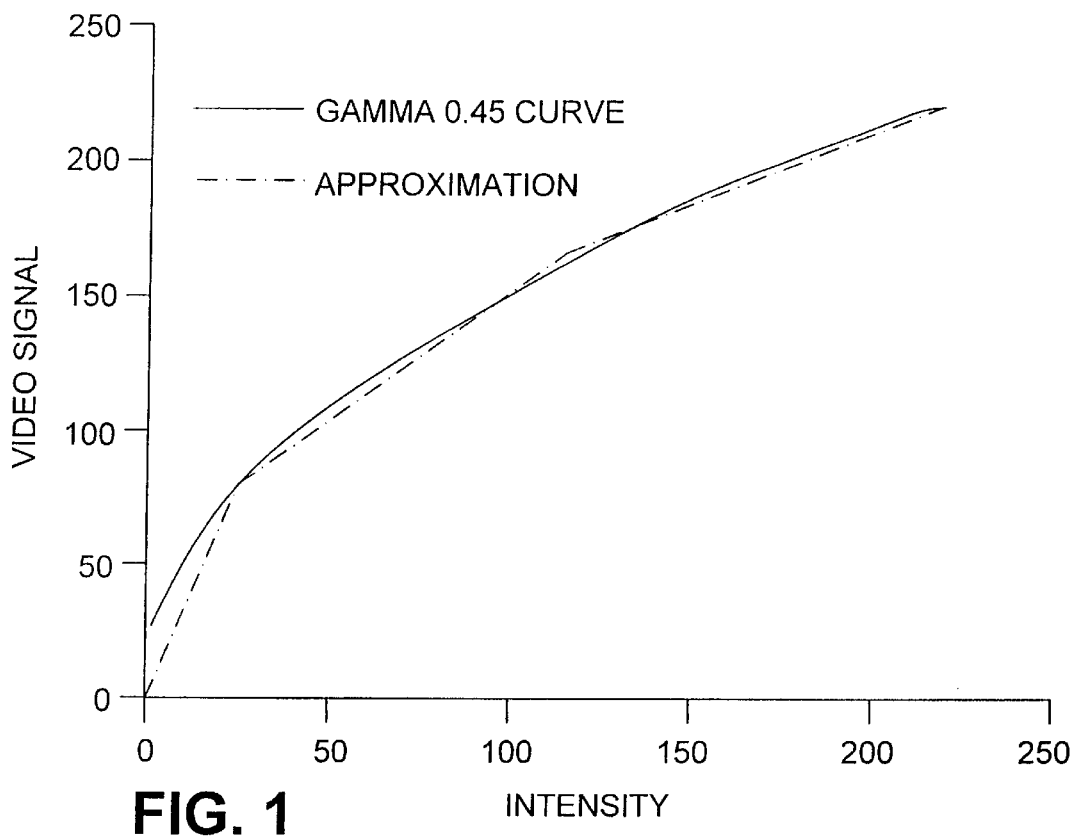

FIG. 1 illustrates in solid line a gamma 0.45 video signal vs intensity correction curve in accordance with the aforenoted CCIT recommendation. An overlaid dashed line illustrates the corresponding approximate gamma correction curve in accordance with an embodiment of the present invention. It may be seen that the dashed line curve is close to the solid curve, and in practice is virtually not distinguishable by the naked eye of a human observer.

Figure 2:
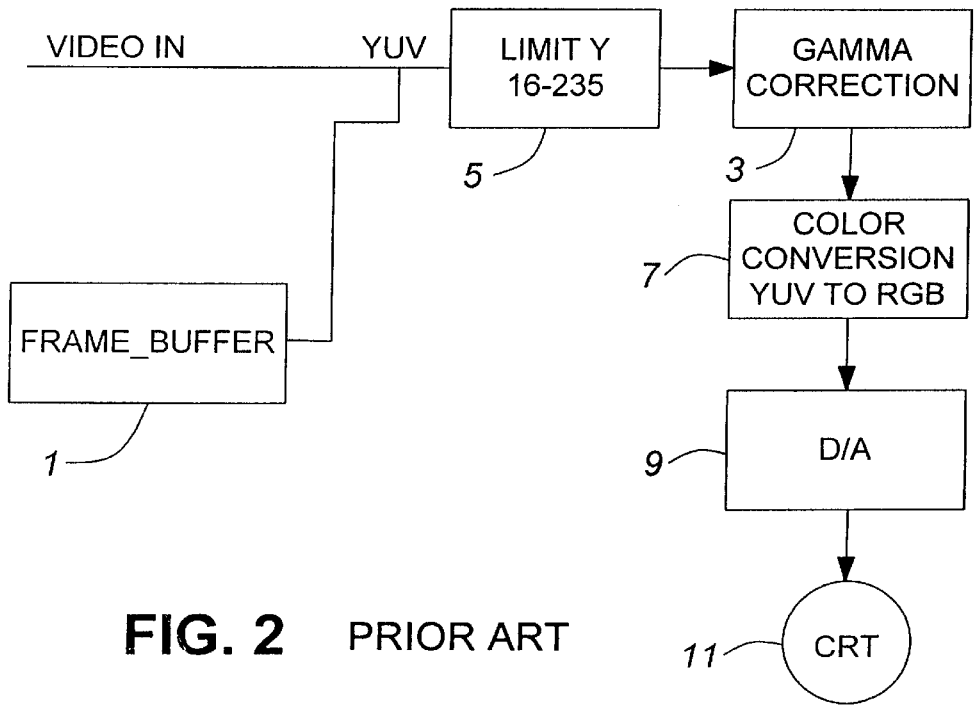

FIG. 2 illustrates the position of a gamma correction circuit in a computer CRT display driving circuit. A video input line and frame buffer I apply a YUV signal to a gamma correction circuit 3, preferably through a y signal limiter 5. The limiter 5 limits the intensity to between 16 and 235 values.

An output signal from the gamma correction circuit is applied to the input of a color conversion circuit 7, which translates the YUV form of signal to an RGB form of signal. The RGB form of signal is applied to a digital to analog (D/A) converter 9, which translates the digital RGB signal to analog form, which is applied to the RGB inputs of a cathode ray tube (CRT) display 11.

In the prior art, the gamma correction circuit is typically a lookup table, in which the Y signal input values are used as entries to a table, and corresponding output values stored with the various input values is returned, the corresponding output values conforming to the solid curve shown in FIG. 1.

In accordance with an embodiment of the present invention, three circuits are used to provide straight line approximations to three segments of the curve, the particular circuit to be used to provide an output signal being selected by a comparison circuit which determines which segment of the curve the input signal indicates.

For gamma correction of the exponent 0.45, the CCIR standard noted above, the respective approximation output signals meeting the straight line curves are provided by circuits having the following transfer functions:

Yg=4*Y−48 for Y<=34
Yg=Y+54 for 34<Y<=127
Yg Y/2+118 for 127<Y where Yg represents the gamma corrected output signal and Y represents the input signal.

Figure 3:
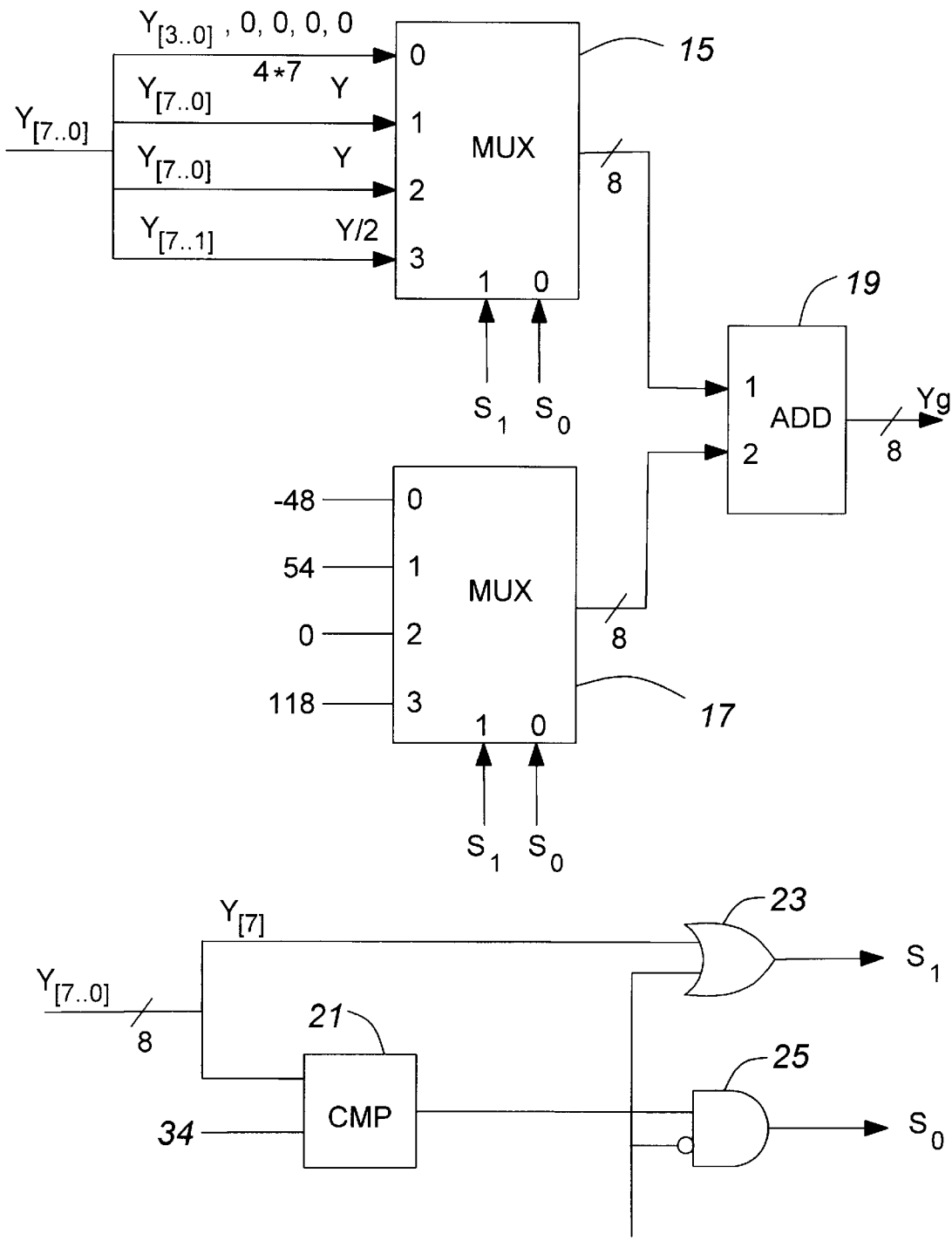

The above is provided in accordance with an embodiment of the present invention by a circuit shown in FIG. 3.

A multiplexer 15 has three, but preferably four inputs 0, 1, 2 and 3. The eight bit input signal Y(7..0) is applied to the inputs of the multiplexer 15 as follows: Y(3 . . . . 0),0,0,0,0 =(4*Y) to input 0, Y(7 . . . 0)=Y to input 1, Y(7 . . . 0)=Y to input 2 and 0,Y( . . . 1)=Y/2 to input 4. Select inputs 1,0 receive select signals S1 and S0 respectively.

Another multiplexer 17 has similar inputs as multiplexer 15. Signals representing constants −48, 54 0 and 118 are applied to the respective corresponding inputs of multiplexer 17. Multiplexer 17 also has inputs 1,0 to which select signals S1 and S0 are applied.

Eight bit outputs of multiplexers 15 and 17 are applied to respective inputs of 8 bit adder 19.

Upon selection of corresponding inputs of the multiplexers, the input signals thereto are passed to their outputs, are added in adder 19, and the sum is provided as an eight bit output signal Yg.

The select signals S1 and S0 are obtained by the use of a comparison circuit 21. An a constant input 34 is applied to one input of circuit 21, and the signal Y(7 . . . 0) is applied to the other. The most significant bit Y(7) of the input signal is applied to one input of AND gate 23. The output signal of comparison circuit 21 is applied to an input of OR gate 25. The outputs of gates 23 and 25 provide the signals S1 and S0 respectively.

A logical gamma off signal is applied to another input of AND gate 23 and to an inverting input of OR gate 25, to control the circuit to provide no gamma correction.

Thus where Y<:p34, and with the gamma off signal a 0, the inputs to AND gate 23 will be 0's, and the S1 signal will be 0. The Y input to the comparison circuit 21 will be below or equal to the constant 34, and the output of the comparison circuit will be 0. The logical 0 gamma off signal will be inverted at the input to OR gate 25, resulting in a 1 input, resulting in SO having the value 1.

The S1=0 and the S0=1 signals applied to the select control inputs of multiplexers 15 and 17 cause them to pass the input signals at their 0 inputs to adder 19, resulting in an output signal Yg therefrom of 4*Y−48.

In a similar manner the comparison circuit 21 will determine that the input signal Y is above 34, changing its output and the output S0; when the input signal Y is above 127 the signal Y(7) will be 1, causing the signal S1 to be 1. These two cases cause the signals at inputs 1 and 3 to pass through multiplexers 15 and 17 and be added to form output signal Yg.

In the case gamma correction is to be off, the gamma correct signal is externally controlled to be 11 and the S1 and S0 signals are as a result changed to 1, 0, selecting the signals at inputs 2 applied to the multiplexers to be passed and be added in adder 19. Since these values are the unmodified Y(7 . . . 0) input signal and the constant 0 to be added to it, the output signal Yg corresponds to the unmodified input signal.

It will be noted that if no gamma off control is required, the gates 23 and 25 can be dispensed with, as well as the gamma off signal.

The above circuit has thus provided in fast circuit form, and with inexpensive multiplexer, adder and AND and OR gates, the three dashed line approximations to corresponding three portions to the solid curve in FIG. 1 described above with respect to the exponent 0.45 transfer functions, with the means for selecting the appropriate approximation circuit used with each Y value.

It should be noted that the invention can be used to provide other gamma correction curves defined by different exponents rather than 0.45, for example ⅛ and ¼. These gamma correction curves can be used for CRTs having different nonlinear characteristics than 0.45, or can be used for other display devices. Indeed, other display devices may have gamma corrected using the principles described herein.

In the case of the gamma correction curves using the exponent ⅛, the transfer functions of the three circuits should have transfer functions Yg=4*Y−48 where Y<=31
Yg=Y+46 where 31<Y<=143
Yg=Y/2+118 where 143<Y.

In the case of the gamma correction curves using the exponent ¼, the transfer functions of the three circuits should have transfer functions Yg=4*Y−48 where Y<=23
Yg=Y+22 where 23<Y<=191
Yg=Y/2+118 where 191<Y.

Figure 4:
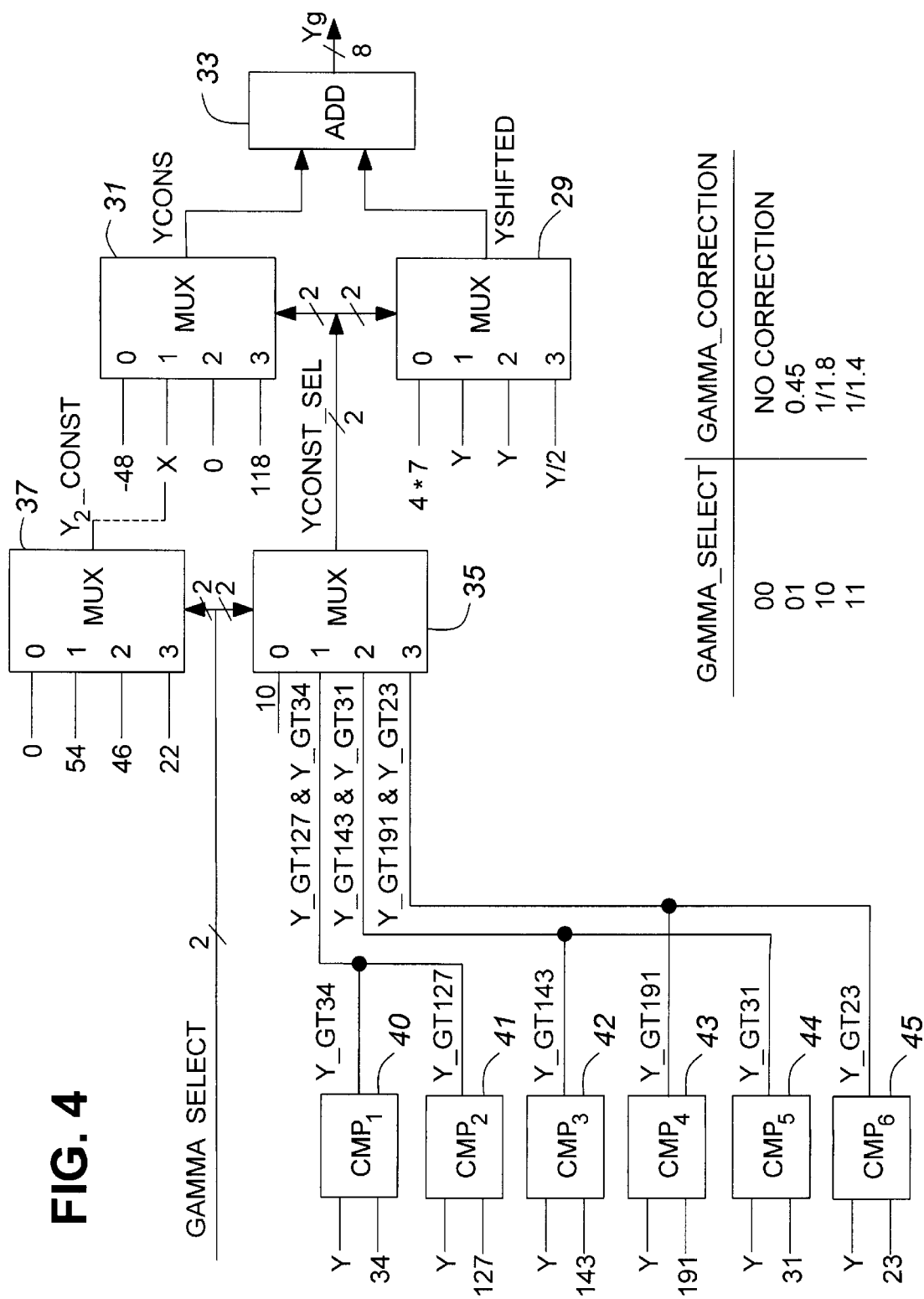

A gamma correction circuit which provides each of the three approximate correction curves conforming to the three sets of transfer functions is shown in FIG. 4.

A pair of multiplexers 29 and 31 have their outputs connected to inputs of adder 33, the output of which provides output signal Yg.

Input signals to multiplexer 29 are the aforenoted signals to multiplexer 15, i.e. 4*Y, Y, Y and Y/2. Input signals to multiplexer 31 represent constants −48, x, 0 and 118.

Input select control signals are applied to the control inputs to multiplexers 29 and 31 from an output of a multiplexer 35. The output signal of a multiplexer 37 is applied to the x input of multiplexer 31. Respective inputs to multiplexer 7 receive signals representing 0, 54, 46 and 22. A gamma select signal (2 bits) is applied to corresponding select control inputs of multiplexers 35 and 37.

A plurality of comparison circuits CMP1–CMP6 40–45 have signals applied to corresponding inputs, respectively representing the constants 34, 127, 143, 191, 31 and 23. The input signal Y is applied to each of the other inputs of comparison circuits 40–45. The output signals of comparison circuits 40 and 41 are applied to input 1 of multiplexer 35, the output signals of comparison circuits 42 and 43 are applied to input 2 of multiplexer 35, and the output signals of comparison circuits 44 and 45 are applied to input 3 of multiplexer 35. The logic signal 10 is applied to input 0 of multiplexer 35.

In operation, the gamma select signal applied to the select inputs of multiplexers 35 and 37 cause one of the constants 0, 54, 46 or 22 to pass through multiplexer 37 and be applied as the signal x to the 1 input of multiplexer 31. It also causes one of the input signals 10 or a logic output signal of one of the pairs of comparison circuits 40–45 applied to the inputs of multiplexer 35, to pass through multiplexer 35, and be applied to the select control inputs of multiplexers 31 and 29.

Thus, for example a gamma select signal causes the signals applied to inputs 1 of multiplexers 37 and 35 to be selected, and pass through those multiplexers. The constant 54 thus appears as the x signal at the 1 input of multiplexer 31. The resulting logic value of the comparison circuits 40 and 41, which indicate whether the Y input signal is below or equal to, or above the input constant 34 applied to comparison circuit 40, or above or below the input constant 127 applied to comparison circuit 41. This logic signal, after passing through multiplexer 35 appears as the select control signal applied to multiplexers 31 and 29.

Multiplexers 29 and 31 operate as described above with regard to the embodiment of FIG. 3, providing an output signal Yg which it may be seen corresponds to the transfer functions of the approximate gamma correction curve having exponent 0.45.

In a similar manner, the logic value of the gamma select signal selects the desired input signals for multiplexers 37 and 35, resulting in an output signal Yg which corresponds to the case of the second S and third set of transfer functions described above with respective exponents 1/1.8 and 1/1.4. A truth table of the exponent values for gamma correction with respect to the value of the gamma select signal is as follows:

| gamma select | gamma correct |
|---|---|
| 0,0 | no correction |
| 0,1 | 0.45 |
| 1,0 | 1/1.8 |
| 1,1 | 1/1.4 |

With the above, the gamma correction circuit encapsulates a shift from the limited input range of the level values 16–235 to 0–219, normalizing the range to 0 to 1, then mapping the range back to 16–235. It will also be noted that the error from the recommended gamma correction curve shown in FIG. 1 is less than the standard square robot error or 2.5%.

It should be noted that an embodiment of the present invention can be implemented in an ASIC, which can be produced from a silicon compiled description using hardware description language, such as the Verilog description language VHDL to specify the same circuit transfer functions and produce gate array. A description in VHDL follows. It should be noted that the input signal Y is given as iHBLD_Y and the two bits which provide the gamma correction value 0.45, 1/1.8 and 1/1.4 is given as QUAL_GAMMA_SEL.

```
GAMMAFIX:block
begin
--For GAMMA_SEL="01" approx=0.45=1/2.2
   Y_GT34 <='1'when(unsigned(iHBLD_Y)>34)else'0',
   Y_GT127<='1'when(unsigned(iHBLD_Y)>127)else'0',
--For GAMMA_SEL="10"approx=1/1.8
   Y_GT31 <='1'when(unsigned(iHBLD_Y)>31)else'0',
   Y_GT143<='1'when(unsigned(iHBLD_Y)>143)else'0',
--For GAMME_SEL-"11"approx=1/1.4
   Y_GT23 <='1'when(unsigned(iHBLD_Y)>23)else'0',
   Y_GT191<='1'when(unsigned(iHBLD_Y)>191)else'0',
   with QUAL_GAMMA_SEL select
     YCONST_SEL<=
       "10"                  when"00",--no correction
       (Y_GT127 & Y_GT34)    when "01", -- 22.22(0.45)
       (Y_GT143 & Y_GT31)    when "1-", -- 1.8
       (Y-GT191 & T_GT23)    when "11", -- 1.4
       (others=>'X') when others:
   with QUAL_GAMMA_SEL select
     Y2_CONST<=
       "00110110"    when "01", -- 54 for 2.2
       "00101110"    when "10", -- 46 for 1.8
       "00010110"    when "11", -- 22 for 1.4
       (others=>'X') when others:
   with YCONST_SELselect
     YCONST<=
       "11010000"    when "0.0", -- -48
       Y2_CONST      when "01", -- 54 or 46 or 22
       "00000000"    when "10"m -- 0
       "01110110"    when "11", -- 118
       (others=>'X') when others;
   with YCONST_SEL select
     YSHIFTED<=
       iHBLD_YY(5 downto 0) & "00"when "00", -- 4*Y
       iHBLD_Y                    when "01", -- Y
       iHBLD_Y                    when "10", --
       '0' & iHBLD_Y(7 downto 1)  when "11", -- Y/2
       (others=>'X') when others;
   xYGAMMA<=unsigned(YCONST)+unsigned(YSHIFTED);
end block
```

A person understanding this invention may now conceive of alternative structures and embodiments or variations of the above. All those which fall within the scope of the claims appended hereto are considered to be part of the present invention.

We claim:

1. A gamma correction circuit comprising circuit means for approximating in linear translation circuits successive nonlinear portions of a gamma correction curve, means for applying an input luminance (Y) signal to the circuit means, and selection means for selecting signals translated by any of the circuit means as a gamma corrected output signal depending on whether the input signal falls within predetermined ranges approximately corresponding to said nonlinear portions of the gamma correction curve, in which the number of circuit means is three, and in which the number of successive nonlinear portions of the gamma correction curve is three, and in which transfer functions of each of the circuit means is $Yg=4*Y-48$ for $Y<=34$ $Yg=Y+54$ for $34<Y<=127$ $Yg=Y/2+118$ for $127<Y$ where Yg represents the gamma corrected output signal and Y represents the input signal.

2. A gamma correction circuit comprising circuit means for approximating in linear translation circuits successive nonlinear portions of a gamma correction curve, means for applying an input luminance (Y) signal to the circuit means, and selection means for selecting signals translated by any of the circuit means as a gamma corrected output signal depending on whether the input signal falls within predetermined ranges approximately corresponding to said nonlinear portions of the gamma correction curve, in which the number of circuit means is three, and in which the number of successive nonlinear portions of the gamma correction curve is three, an in which transfer functions of each of the circuit means is Yg=4*Y−48 where Y<=31
Yg=Y+46 where 31<Y<−143
Yg=Y/2+118 where 143<Y where Yg represents the gamma corrected output signal and Y represents the input signal.

3. A gamma correction circuit comprising circuit means for approximating in linear translation circuits successive nonlinear portions of a gamma correction curve, means for applying an input luminance (Y) signal to the circuit means, and selection means for selecting signals translated by any of the circuit means as a gamma corrected output signal depending on whether the input signal falls within predetermined ranges approximately corresponding to said nonlinear portions of the gamma correction curve, in which the number of circuit means is three, and in which the number of successive nonlinear portions of the gamma correction curve is three, and in which transfer functions of each of the circuit means is Yg−4*Y−48 where Y<=23
Yg=Y+22 where 23<Y<−191
Yg Y/2+118 where 191<Y where Yg represents the gamma corrected output signal and Y represents the input signal.

4. A gamma correction circuit comprising means for applying an input intensity signal (Y) to plural parallel circuit paths, means for successively choosing output signals from respective ones of the circuit paths, a first circuit path having transfer function Yg=4*y−48, a second circuit path having transfer function Yg=Y+54 and a third circuit path having transfer function Yg=Y/2+118, where Yg represents an output-signal from a circuit path, the means for selecting comprising means for outputting an output signal from a first circuit path when the input signal Y<=34, from a second circuit path when 34<Y<=127 and from a third circuit path when 127<Y.

5. A circuit as defined in claim 4 in which each of the circuit paths is comprised of a pair of subcircuit paths connected to respective inputs of an adder, first respective subcircuit paths having transfer functions 4*Y, Y and Y/2 respectively, and second respective subcircuit paths having transfer functions −48, 54 and 118 respectively.

6. A gamma correction circuit comprising a first multiplexer for receiving at respective inputs the signals 4*Y, Y and Y/2, where Y is an input luminance signal, a second multiplexer for receiving a respective inputs signal constants −48, 54 0 and 118, means for selecting corresponding ones of the inputs of both multiplexers, adder means for adding the selected inputs of the multiplexers for providing a gamma corrected output signal Yg, the means for selecting comprising a comparing circuit, means for applying successive 8 bit words of the Y signal to an input of the comparing circuit, means for applying a constant signal value 34 to another input of the comparing circuit, the means for selecting comprising means for providing a signal corresponding to the most significant bit of the Y signal and the output signal of the comparing circuit to control inputs of the multiplexers.

7. A circuit a defined in claim 6 further including an AND gate and an OR gate having an inverting input, and means for applying the most significant bit of the Y signal to an input of the AND gate, means for applying an output signal of the comparing circuit to the non-inverted input of the OR gate, and means for applying a gamma off signal to a second input of the AND gate and the inverting input of the OR gate, and providing output signals of the AND and OR gates to corresponding control inputs of the multiplexers.

8. A circuit as defined in claim 7, further including a limiter for limiting the Y signal to an intensity range 16–235 prior to providing it to the first and second multiplexers.

9. A gamma correction circuit comprising a first pair of multiplexers, means for applying luminance signals 4*Y, Y, Y and Y/2 to respective inputs of a first of the first pair of multiplexers, where Y is an input luminance signal, means for applying signals having constant values −48, x, 0 and 118 to corresponding respective inputs of a second of the second pair of multiplexers, each multiplexer of the first pair of multiplexers having input select control inputs, a second pair of multiplexers, means for applying a null, CMP1 and CMP2, CMP3 and CMP5, and CMP4 and CMP6 signals to respective inputs of a first of the second pair of multiplexers, means for applying a null and constant signal values 54, 46 and 22 to respective inputs of a second of the second pair of multiplexers, means for providing a gamma select signal to corresponding control inputs of the second pair of multiplexers, means for applying an output signal of the first of the second pair of multiplexers to corresponding control inputs of the first pair of multiplexer, means for providing an output signal of the second multiplexer of the second pair of multiplexers as the signal x, a plurality of comparison circuits for providing said respective output signals CMP1, CMP2, CMP3, CMP4, CMP5 and CMP6, means for applying the Y signal to an input of each of said comparison circuits, and means for applying signals having constant values 34, 127, 143, 191, 31 and 23 to respective other inputs of respective ones of said comparison circuits, and wherein said gamma select signal controls said gamma correction circuit to provide gamma correction in accordance with a truth table:

| gamma select | gamma correct |
| --- | --- |
| 0,0 | no correction |
| 0,1 | 0.45 |
| 1,0 | 1/1.8 |
| 1,1 | 1/1.4 |

10. A gamma correction circuit as defined in claim 9 in the form of an ASIC.

11. A gamma correction circuit comprising an application specific integrated circuit (ASIC) comprised of an arrangement of gates resulting from a silicon compiled hardware description:

```
GAMMAFIX:block
begin
--For GAMMA_SEL="01" approx=0.45=1/2.2
   Y_GT34  <='1'when(unsigned(iHBLD_Y)>34)else'0',
   Y_GT127<='2'when(unsigned(iHBLD_Y)>127)else'0',
--For GAMMA_SEL="10"approx=1/1.8
   Y_GT31  <='1'when(unsigned(iHBLD_Y)>31)else'0',
   Y_GT143<='1'when(unsigned(iHBLD_Y)>143)else'0',
--For GAMME_SEL-"11"approx=1/1.4
   Y_GT23  <='1'when(unsigned(iHBLD_Y)>23)else'0',
   Y_GT191<='1'when(unsigned(iHBLD_Y)>191)else'0',
   with QUAL_GAMMA_SEL select
      YCONST_SEL<=
         "10"                  when"00",--no correction
         (Y_GT127 & Y_GT34)  when "01", -- 22.22(0.45)
         (Y_GT143 & Y_GT31)  when "1-", -- 1.8
```

-continued

```
    (Y-GT191 & T_GT23)    when "11", -- 1.4
    (others=>'X') when others:
with QUAL_GAMMA_SEL select
    Y2_CONST<=
        "00110110"    when "01", -- 54 for 2.2
        "00101110"    when "10", -- 46 for 1.8
        "00010110"    when "11", -- 22 for 1.4
    (others=>'X') when others:
with YCONST_SELselect
    YCONST<=
        "11010000"    when "00", -- -48
        Y2_CONST     when "01", -- 54 or 46 or 22
        "00000000"    when "10"m -- 0
        "01110110"    when "11", -- 118
    (others=>'X') when others;
with YCONST_SEL select
    YSHIFTED<=
        iHBLD_YY(5 downto 0) & "00" when "00", -- 4*Y
        iHBLD_Y                         when "01", -- Y
        iHBLD_Y                         when "10", -- Y
        '0' & iHBLD_Y(7 downto 1) when "11", -- Y/2
    (others=>'X') when others;
XYGAMMA<=unsigned(YCONST)+unsigned(YSHIFTED);
end block
``` where iHBLD is an input luminance signal and

QUAL GAMMA_SEL is a control signal for selecting a gamma correction conforming to a standard transfer function with one of the exponents 0.45, 1/1.8 and 1/1.4.

12. A gamma correction circuit comprising means for applying an input intensity signal (Y) to plural parallel circuit paths, means for successively choosing output signals from respective ones of the circuit paths, a first circuit path having transfer function Yg=4*y−48, a second circuit path having transfer function Yg=Y+46 and a third circuit path having transfer function Yg=Y/2+118, where Yg represents an output signal from a circuit path, the means for selecting comprising means for outputting an output signal from a first circuit path when the input signal Y<=31, from a second circuit path when 31<Y<=143 and from a third circuit path when 143<Y.

13. A circuit as defined in claim 12 in which each of the circuit paths is comprised of a pair of subcircuit paths connected to respective inputs of an adder, first respective subcircuit paths having transfer functions 4*Y, Y and Y/2 respectively, and second respective subcircuit paths having transfer functions −48, 46 and 118 respectively.

14. A gamma correction circuit comprising a first multiplexer for receiving at respective inputs the signals 4*Y, Y and Y/2, where Y is an input luminance signal, a second multiplexer for receiving a respective inputs signal constants −48, 46, 0 and 118, means for selecting corresponding ones of the inputs of both multiplexers, adder means for adding the selected inputs of the multiplexers for providing a gamma corrected output signal Yg, the means for selecting comprising a comparing circuit, means for applying successive 8 bit words of the Y signal to an input of the comparing circuit, means for applying a constant signal value 31 to another input of the comparing circuit, the means for selecting comprising means for providing a signal corresponding to the most significant bit of the Y signal and the output signal of the comparing circuit to control inputs of the multiplexers.

15. A gamma correction circuit comprising means for applying an input intensity signal (Y) to plural parallel circuit paths, means for successively choosing output signals from respective ones of the circuit paths, a first circuit path having transfer function Yg=4*y−48, a second circuit path having transfer function Yg Y+22 and a third circuit path having transfer function Yg=Y/2+118, where Yg represents an output signal from a circuit path, the means for selecting comprising means for outputting an output signal from a first circuit path when the input signal Y<=23, from a second circuit path when 23<Y<=191 and from a third circuit path when 191<Y.

16. A circuit as defined in claim 17 in which each of the circuit paths is comprised of a pair of subcircuit paths connected to respective inputs of an adder, first respective subcircuit paths having transfer functions 4*Y, Y and Y/2 respectively, and second respective subcircuit paths having transfer functions −48, 22 and 118 respectively.

17. A gamma correction circuit comprising a first multiplexer for receiving at respective inputs the signals 4*Y, Y and Y/2, where Y is an input luminance signal, a second multiplexer for receiving a respective inputs signal constants −48, 22, 0 and 118, means for selecting corresponding ones of the inputs of both multiplexers, adder means for adding the selected inputs of the multiplexers for providing a gamma corrected output signal Yg, the means for selecting comprising a comparing circuit, means for applying successive 8 bit words of the Y signal to an input of the comparing circuit, means for applying a constant signal value 23 to another input of the comparing circuit, the means for selecting comprising means for providing a signal corresponding to the most significant bit of the Y signal and the output signal of the comparing circuit to control inputs of the multiplexers.

* * * * *